(12) United States Patent
Bahirat et al.

(10) Patent No.: US 12,430,604 B2
(45) Date of Patent: Sep. 30, 2025

(54) METHOD FOR SCENE SEGMENTATION

(71) Applicant: Simbe Robotics, Inc., South San Francisco, CA (US)

(72) Inventors: Kanchan Bahirat, South San Francisco, CA (US); Shiva Reddy, South San Francisco, CA (US); Bradley Bogolea, South San Francisco, CA (US); Jariullah Safi, South San Francisco, CA (US)

(73) Assignee: Simbe Robotics, Inc., South San Francisco, CA (US)

( * ) Notice: Subject to any disclaimer, the term of this patent is extended or adjusted under 35 U.S.C. 154(b) by 436 days.

(21) Appl. No.: 17/839,312

(22) Filed: Jun. 13, 2022

(65) Prior Publication Data

US 2022/0383248 A1 Dec. 1, 2022

Related U.S. Application Data

(63) Continuation-in-part of application No. 17/727,044, filed on Apr. 22, 2022, which is a continuation of (Continued)

(51) Int. Cl.
*G06Q 10/087* (2023.01)
*G05D 1/00* (2024.01)
(Continued)

(52) U.S. Cl.
CPC ......... *G06Q 10/087* (2013.01); *G05D 1/0274* (2013.01); *G05D 1/0282* (2013.01); *G06F 18/21* (2023.01); *G06F 18/22* (2023.01);

*G06V 10/987* (2022.01); *G06V 20/52* (2022.01); *H04N 1/00* (2013.01); *H04N 23/66* (2023.01);
(Continued)

(58) Field of Classification Search
CPC .... G06Q 10/087; G06Q 20/203; G06Q 10/08; G06V 20/52; G06V 10/25; G06V 10/26
See application file for complete search history.

(56) References Cited

U.S. PATENT DOCUMENTS

| 10,169,660 | B1 * | 1/2019 | Ren | H04L 67/10 |
| 2008/0077511 | A1 * | 3/2008 | Zimmerman | G06Q 10/087 |
| | | | | 705/28 |

(Continued)

*Primary Examiner* — Florian M Zeender
*Assistant Examiner* — Vanessa Deligi
(74) *Attorney, Agent, or Firm* — Run8 Patent Group, LLC; Peter Miller; Leah Raddatz

(57) ABSTRACT

One variation of a method for segmenting scenes of product units arranged in inventory structures within a store includes: accessing an image based on data captured by a mobile robotic system; detecting a shelving segment in the image; reading a segment identifier from a segment tag, detected in the image, arranged on the shelving segment; accessing a product template representing a product type in the set of product types assigned to the shelving segment based on the segment identifier; detecting a set of product features, in the first region of the image. In response to detecting the set of product features analogous to features of the product template: confirming presence of the unit of the first product type on the shelf in the shelving segment and appending the first product type to a list of product types presently stocked in the shelving segment.

17 Claims, 5 Drawing Sheets

Related U.S. Application Data application No. 16/578,406, filed on Sep. 23, 2019, now Pat. No. 11,341,454, which is a continuation of application No. 15/600,527, filed on May 19, 2017, now Pat. No. 10,467,587.

(60) Provisional application No. 63/209,888, filed on Jun. 11, 2021, provisional application No. 62/339,039, filed on May 19, 2016.

(51) Int. Cl.

| | | |
|---|---|---|
| *G06F 18/21* | (2023.01) | |
| *G06F 18/22* | (2023.01) | |
| *G06V 10/98* | (2022.01) | |
| *G06V 20/52* | (2022.01) | |
| *H04N 1/00* | (2006.01) | |
| *H04N 23/66* | (2023.01) | |
| *H04N 23/698* | (2023.01) | |
| *H04N 25/615* | (2023.01) | |

(52) U.S. Cl.
CPC ......... *H04N 23/698* (2023.01); *H04N 25/615* (2023.01); *G05D 1/0246* (2013.01)

(56) References Cited

U.S. PATENT DOCUMENTS

| | | | |
|---|---|---|---|
| 2009/0043676 A1* | 2/2009 | Riley | G06Q 30/0264 705/26.1 |
| 2010/0123009 A1* | 5/2010 | Cherry | G06K 7/14 235/469 |
| 2014/0300765 A1* | 10/2014 | Takao | H04N 23/6842 348/208.1 |
| 2015/0088703 A1* | 3/2015 | Yan | G06Q 10/087 705/28 |
| 2015/0235157 A1* | 8/2015 | Avegliano | G06Q 10/087 705/7.25 |
| 2015/0262116 A1* | 9/2015 | Katircioglu | G06Q 10/087 705/28 |
| 2015/0264128 A1* | 9/2015 | Huang | H04L 67/1006 709/203 |
| 2015/0363625 A1* | 12/2015 | Wu | G06K 7/1447 382/203 |
| 2016/0114488 A1* | 4/2016 | Mascorro Medina | B25J 9/1697 901/1 |
| 2016/0171707 A1* | 6/2016 | Schwartz | G06F 18/22 382/180 |
| 2017/0177656 A1* | 6/2017 | Johnson | G06F 16/951 |
| 2017/0225891 A1* | 8/2017 | Elazary | G05D 1/0234 |
| 2017/0278056 A1* | 9/2017 | Itou | G06Q 10/087 |
| 2017/0286901 A1* | 10/2017 | Skaff | G06V 10/751 |

* cited by examiner

METHOD FOR SCENE SEGMENTATION

CROSS-REFERENCE TO RELATED APPLICATIONS

This Application is a continuation-in-part application of U.S. patent application Ser. No. 17/727,044, filed on 22 Apr. 2022, which is a continuation of U.S. patent application Ser. No. 16/578,406, filed on 23 Sep. 2019, which is a continuation of U.S. patent application Ser. No. 15/600,527, filed on 19 May 2017, which claims the benefit of U.S. Provisional Application 62/339,039 filed on 19 May 2016, all of which are incorporated in their entireties by this reference.

This Application claims the benefit of U.S. Provisional Application No. 63/209,888, filed on Jun. 11, 2021, which is incorporated in its entirety by this reference.

TECHNICAL FIELD

This invention relates generally to the field of stock keeping and more specifically to a new and useful method for segmenting scenes of product units on inventory structures within a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1-5, a method S100 for segmenting scenes of product units arranged in inventory structures within a store includes: accessing an image (e.g., a color image, a photographic image, a composite image assembled by the computer system from multiple images) based on data captured by a mobile robotic system autonomously traversing the store during a scan cycle in Block S102; detecting, in the image, a shelving segment, a shelf face of a shelf in the shelving segment, a first vertical edge of the shelf face, a second vertical edge of the shelf face, and a segment tag arranged on the shelving segment in Block S120; reading a segment identifier from the segment tag in Block S130; accessing a set of product templates representing a set of product types assigned to the shelving segment based on the segment identifier in Block S140; defining a lateral extent of the shelving segment based on the first vertical edge of the shelf face and the second vertical edge of the shelf face; defining a first region in the image depicting the shelving segment based on the lateral extent of the shelving segment in Block S150. The method S100 further includes: in response to detecting a set of product features, in the first region of the image, analogous to a product template, in the set of product templates and corresponding to a unit of a first product type in the set of product types: confirming presence of the unit of the first product type on the shelf in the shelving segment in Block S160 and appending the first product type to a list of product types presently stocked in the shelving segment in Block S170.

Figure 4:
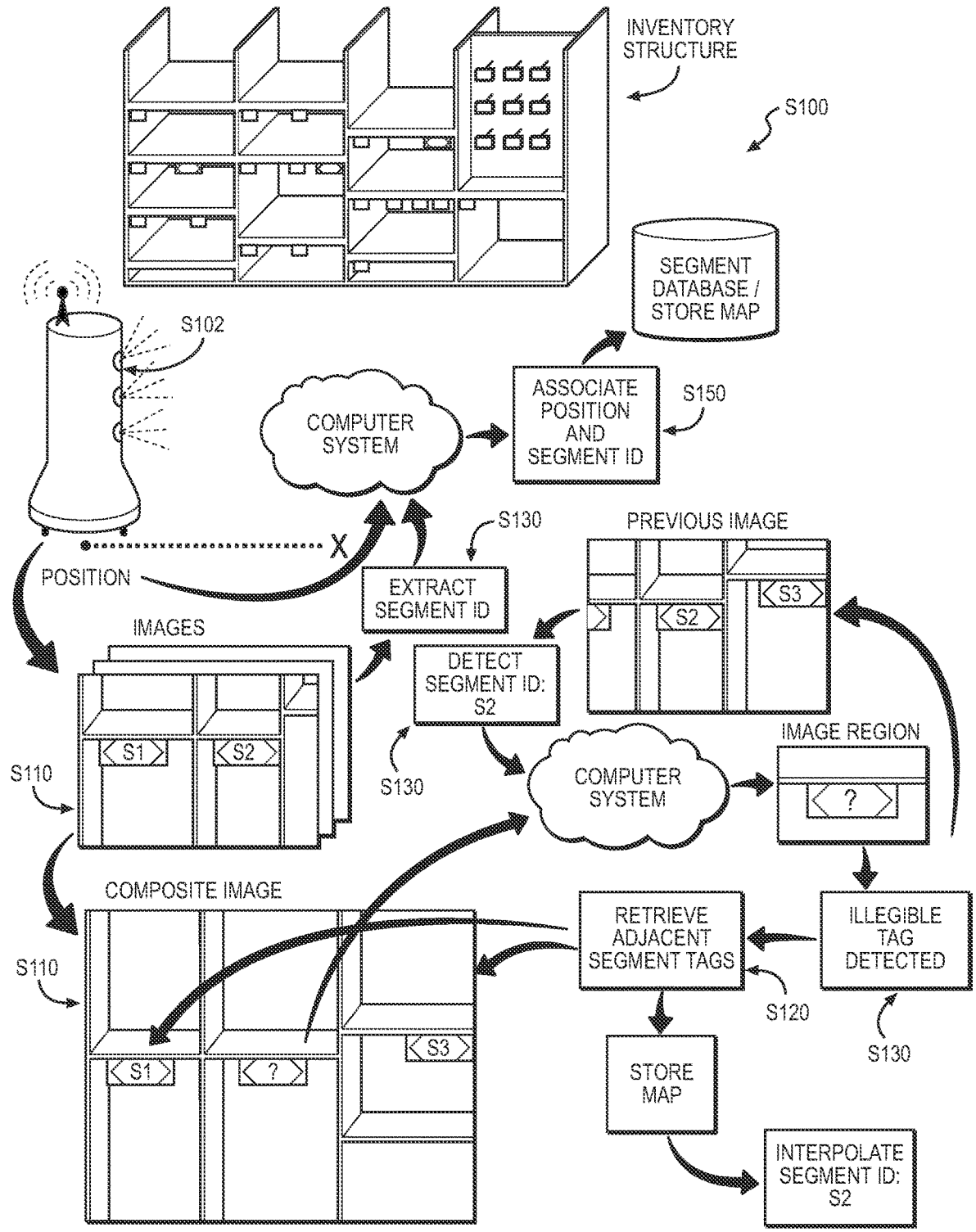
FIG. 4 is a flowchart representation of one variation of the method.
Figure 5:
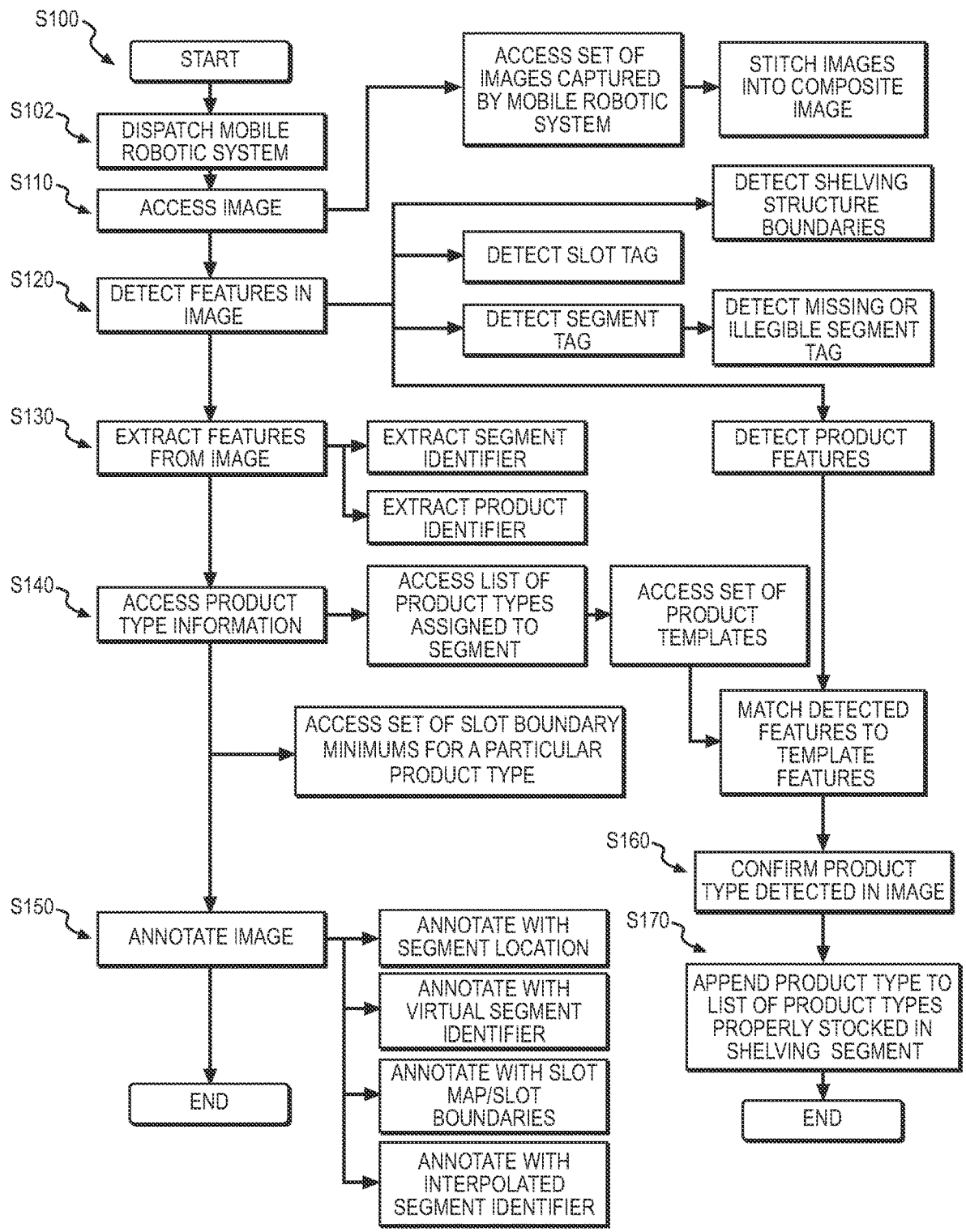
FIG. 5 is a flowchart representation of one variation of the method.

In one variation shown in FIGS. 4-5, the method S100 includes: assigning a virtual segment identifier to the shelving segment in Block S130 and accessing the set of product templates representing the set of product types assigned to the shelving segment based on the virtual segment identifier in Block S140.

Figure 1:
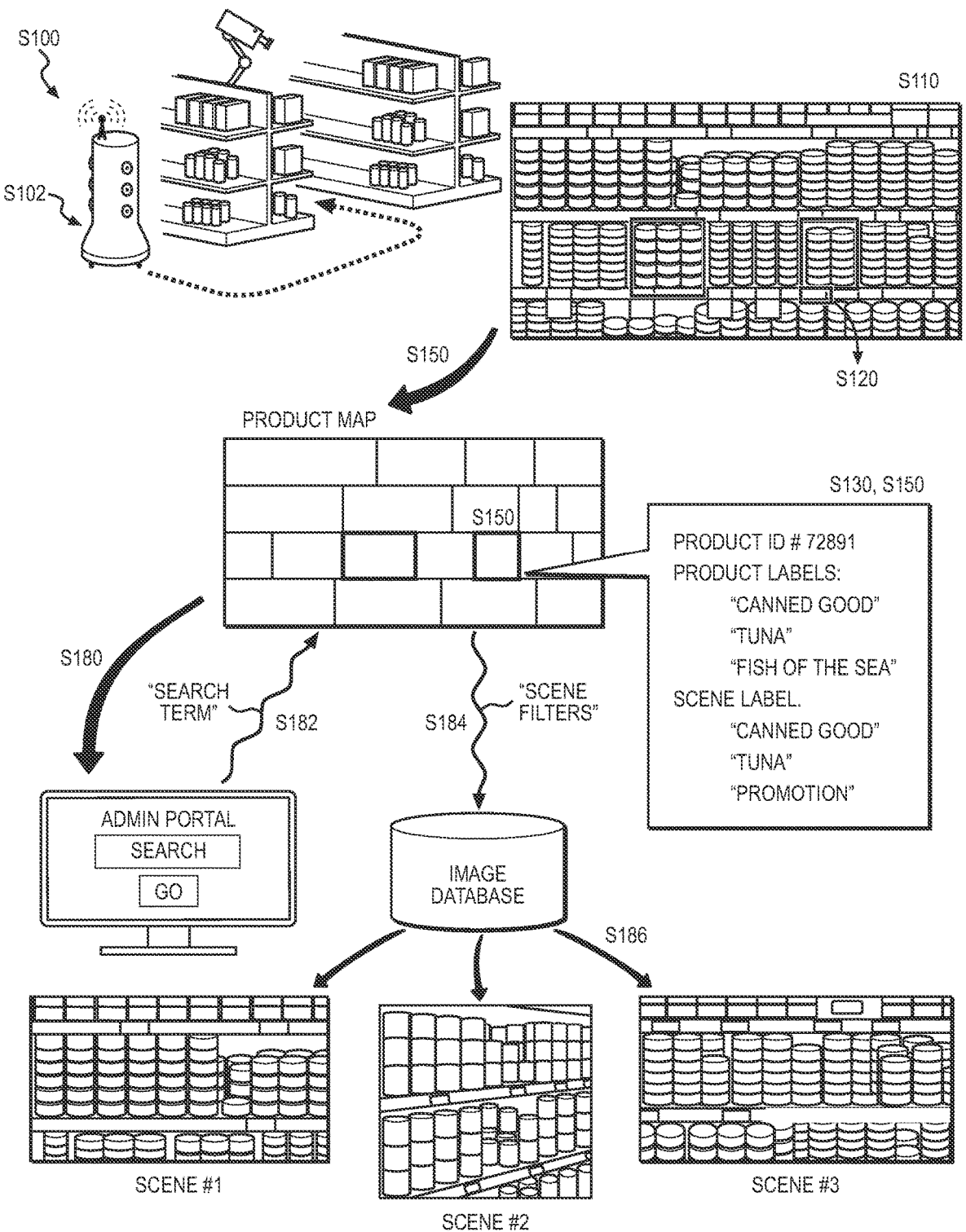
FIG. 1 is a flowchart representation of a method.
Figure 2:
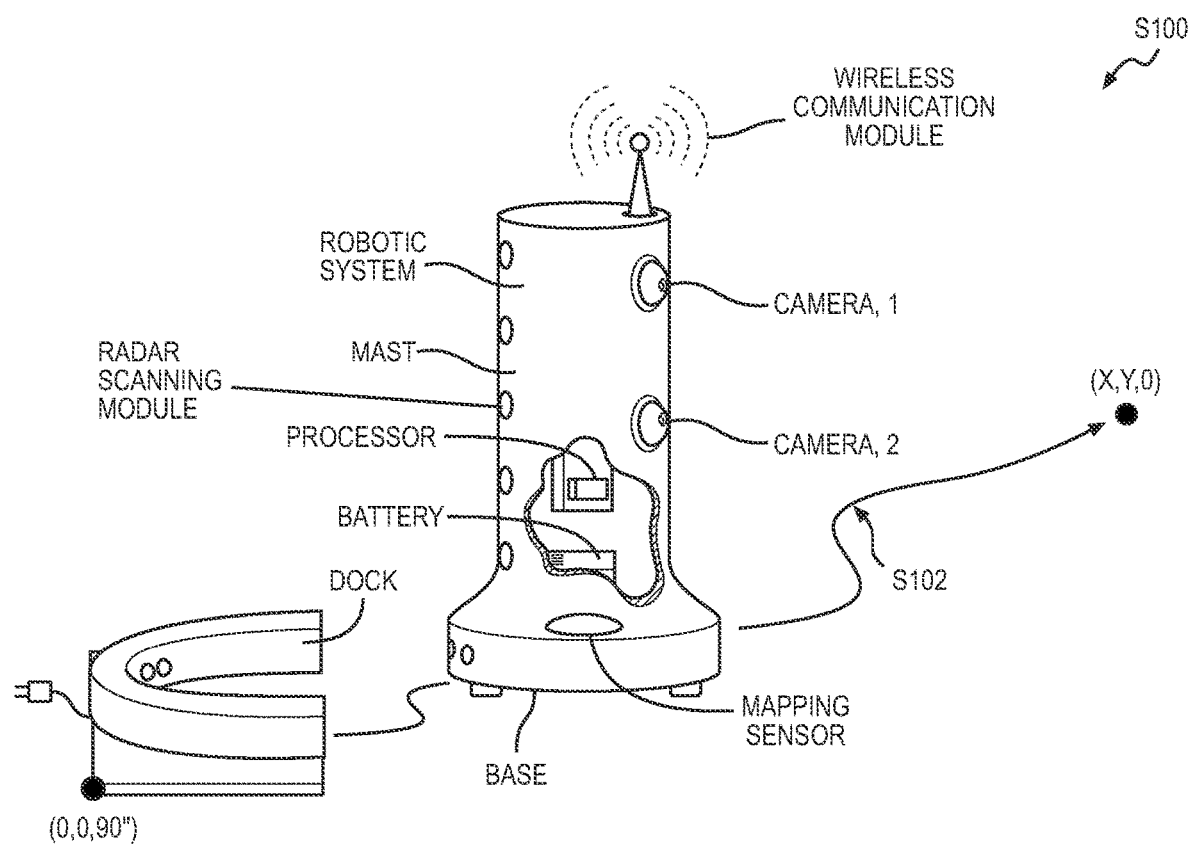
FIG. 2 is a schematic representation of a robotic system.
Figure 3:
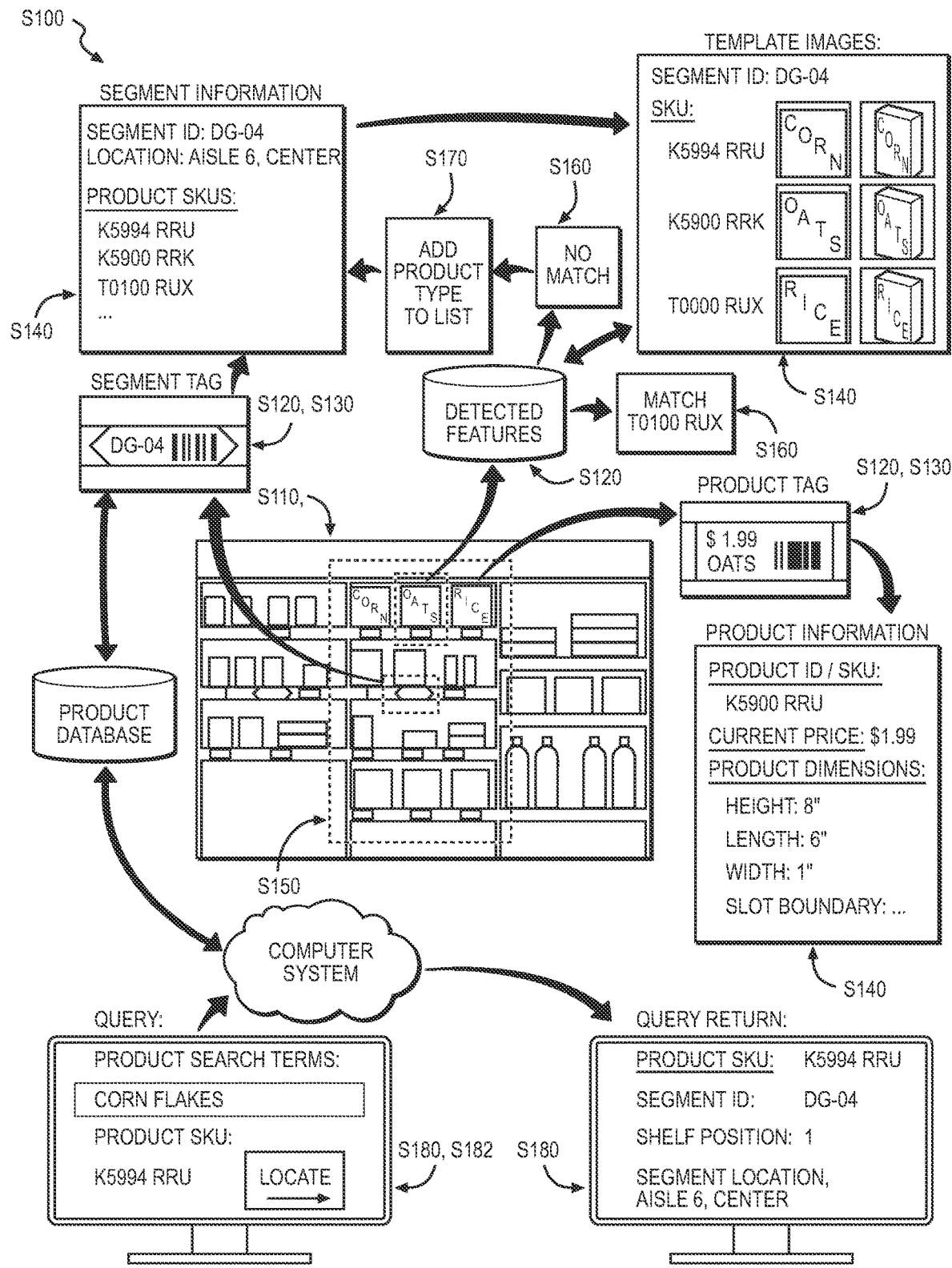
FIG. 3 is a flowchart representation of one variation of the method.

In another variation shown in FIGS. 1-2, the method S100 includes: dispatching a robotic system to capture images of inventory structures throughout a retail space (e.g., a grocery store) in Block S102; accessing an image (e.g., a 2D photographic image) of an inventory structure, in a set of inventory structures, within the store in Block S120; initializing a slot map of the set of inventory structures within the store in Block S150; detecting a set of shelving segments on the inventory structure depicted in the image; projecting a set of vertical lines corresponding to the set of shelving segments of the inventory structure onto the slot map; detecting a set of shelf faces on the inventory structure depicted in the image; projecting a set of horizontal lines corresponding to the set of shelf faces onto the slot map (i.e., forming a 2D vectorized grid on the slot map); and detecting a set of slot tags in the image in Block S140. For each slot tag in the set of slot tags, the method S100 includes: projecting a location of the slot tag onto the slot map in Block S154; detecting a slot corresponding to the location of the slot tag in Block S154; projecting a set of vertical slot lines corresponding to the slot—such as a first slot line representing a left boundary of the slot and a second slot line representing a right boundary of the slot between the set of vertical lines representing the shelving segments—onto the slot map; identifying a product identifier on the slot tag in Block S134; retrieving a set of product labels (e.g., a product category, a product attribute such as gluten-free or vegan, a promotional status) associated with the product identifier in Block S134; and annotating the slot map with the product identifier and the set of product labels for the slot corresponding to the slot tag in Block S150.

In one variation, the computer system can: generate a user interface on a computing device in Block S180; receive a set of keywords and/or search terms via the user interface in Block S182; apply a set of scene filters to the slot map based on the set of keywords and/or search terms in Block S184; and retrieve a set of images that match the scene filters in Block S186.

2. Applications

Generally, Blocks of the method S100 can be executed by a computer system: to dispatch a robotic system to capture images (e.g., 2D photographic images) of inventory structures throughout a retail space (e.g., a grocery store); to detect, identify, and read segment tags associated with segments of inventory structures (hereinafter "shelving segment") containing groups of shelves, hooks and other elements to support units of product types in the segment of the inventory structure; to detect, identify, and read slot tags associated with slots containing product units on these inventory structures; to retrieve product labels corresponding to these product units stocked in these inventory structures based on these slot tags; to apply scene labels to a shelving segment or a set of slots on these inventory structures based on these product labels; and to automatically segment images of inventory structures throughout the store based on these segment locations, slot locations, product labels, and scene labels. The computer system can then leverage characteristics of a scene described by an image segment to: predict product types present in a shelving segment depicted in this image segment (e.g., based on a segment identifier and an associated list of product types assigned to the shelving segment); predict product types present in slots depicted in this image segment (e.g., based on the product category represented by the scene); and selectively compare product units depicted in this image segment to template images of these predicted product types, thereby reducing processing load, increasing accuracy, and increasing completeness of inventory detection in slots in this scene even without any preexisting information (e.g., a planogram or store map) or scan data for this scene.

Generally, the computer system can execute Blocks of the method 100 to detect a segment tag and a set of slot tags arranged within a shelving segment depicted in an image. The computer system can distinguish a segment tag from a slot tag based on size, shape, dimension, color, or the visual information extracted from the segment tag or slot tag. In particular, a slot tag can include a product identifier, such as a barcode, and a price; a segment tag can include a segment identifier, such as a string of characters or a QR Code, which is interpretable by the computer system or a human. Generally, the segment identifier identifies a particular shelving segment in the store and can be associated to a physical location in the store, and to a list of product types assigned to the slots in the shelving segment. In one example, the computer system can generate the list of product types assigned to a shelving segment by extracting the product identifiers from the set of slot tags detected in an image depicting the shelving segment and aggregating the product types corresponding to the product identifiers into the list of product types assigned to the shelving segment.

For example, the computer system can execute Blocks of the method S100 to onboard a new store for tracking and maintaining inventory states of product units on inventory structures within the store without relying on a planogram or other preexisting map of the store, such as if a planogram is not available for the store. The computer system can: access images of inventory structures captured by the mobile robotic system while traversing the store during a scan cycle; initialize slot maps for these inventory structures; detect slot tags in these images; retrieve product characteristics (e.g., category, sub-category, brand, color, package type) linked to product identifiers read from these slot tags; and populate the slot maps with labels containing these product characteristics. The computer system can then: segment these slot maps into scenes based on boundaries of slots labeled with like characteristics (e.g., identical or related product categories); and implement product recognition techniques to detect product inventory in slots in a particular scene based on template images of product types of this characteristic associated with the particular scene.

Additionally or alternatively, the computer system can: segment these slot maps into scenes based on boundaries of slots labeled with characteristics that match search terms entered by a user (e.g., a store manager); project boundaries of these slot maps onto images of corresponding inventory structures to define image segments that depict scenes according to these search terms; and then return these image segments to the user, thereby enabling the user to quickly access and remotely view photographic image segments of inventory structures containing product types that match the user's query. In particular, the computer system can: apply a set of scene filters to the slot map based on a set of search terms entered by the user (e.g., via a product search portal hosted by the computer system) to define boundaries around slots labeled with characteristics that match these search terms; project these boundaries onto images depicting corresponding inventory structures to define crop areas around groups of slots that match these search terms; and return these crop areas to the user (e.g., via the product search portal), thereby enabling the user to view all scenes that match the search terms. Thus, the computer system can: define image segments that depict scenes (e.g., groups of slots and/or products) that fulfill a user's search terms (e.g., a particular product category, subcategory, brand, price range, promotional status); and return these image segments to the user in near real-time, thereby enabling the user to rapidly access accurate, up-to-date, and targeted visual information for the slots and products of certain characteristics stocked throughout the store.

Furthermore, the computer system can generate brand reports by collecting and cataloging data for product units according to scene data for a product category. For example, brands of products located within the store use product categories to evaluate a performance of the brand's products (e.g., purchase rates, restocking rates), a promotional activity of the brand's products (e.g., a store compliance with a designated promotion schedule), a market share of the brand's products relative to other products in that product category, a competitive placement of the brand's products on the inventory structures, and other relevant information for monitoring and evaluating a brand's products.

Furthermore, the computer system can: detect a missing and/or illegible slot tag for a slot; retrieve scene data for the slot; and identify a set of product units in the slot based on the scene data. For example, slot tags adjacent individual slots may become torn, bent, misshapen, and/or lost and therefore illegible to the computer system in images captured by the mobile robotic system. However, a slot associated with an illegible tag may be assigned a product type in the same product category as product types specified by nearby slot tags (i.e., a "scene"). Therefore, the computer system can: define scene boundaries around slots labeled with like product characteristics (e.g., product category)—based on legible slot tags—in the slot map; predict a particular product category of a product type assigned to a slot by an illegible slot tag based on the product category of a particular scene boundary that contains this slot; retrieve template images of product types in this particular product category; and identify product units occupying this slot based on comparisons of these template images to features extracted from a region of an image depicting this slot. Thus, the computer system can automatically interpret scenes throughout the store and leverage characteristics of these scenes to streamline product identification in slots with illegible slot tags, thereby reducing computational load and increasing inventory tracking accuracy of the computer system and mobile robotic system even during a first scan cycle of the store and if no planogram or other store information is available.

3. Terms

A "store" is referred to herein as a (static or mobile) facility containing one or more inventory structures.

A "product" is referred to herein as a type of loose or packaged good associated with a particular product identifier (e.g., a SKU) and representing a particular class, type, and varietal.

A "unit" or "product unit" is referred to herein as an instance of a product—such as one bottle of detergent, one box of cereal, or package of bottle water—associated with one SKU value.

A "product facing" is referred to herein as a side of a product designated for a slot.

A "slot" is referred to herein as a section (or a "bin") of a shelf on an "inventory structure" designated for storing and displaying product units of the product type (i.e., of the identical SKU or CPU). An inventory structure can include a shelving segment, a shelving structure, or other product display containing one or more slots on one or more shelves.

A "planogram" is referred to herein as a plan or layout designating display and stocking of multiple product facings across multiple slots, such as: in a particular shelving segment; across a particular shelving structure; across multiple shelving structures within a particular aisle; across multiple aisles in the store; or throughout the entirety of the store. In particular, the planogram can specify a target product type, a target product placement, a target product quantity, a target product quality (e.g., ripeness, time to peak ripeness, maximum bruising), and/or a target product orientation for a fully-stocked slot for each slot represented in the planogram. For example, the planogram can define a graphical representation of an inventory structure in the store, including graphical representations of each slot in this inventory structure, each populated with a quantity of graphical representations of product type assigned to this slot equal to a quantity of product facings assigned to this slot. Alternatively, the planogram can record textual product placement for one or more inventory structures in the store in the form of a spreadsheet, slot index, or other database.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on photographic images and/or other data recorded by the robotic system while autonomously executing scan cycles in the store.

A "slot map" is referred to herein as a representation of a layout of a set of inventory structures within the store in a 2D vectorized grid that, for each inventory structure, designates horizontal shelf facings on the inventory structure, vertical gaps between shelving segments of the inventory structure, and individual slots containing product units on the inventory structure. The computer system can initialize the slot map (e.g., when onboarding a new store that does not have or use a planogram for the store) and populate the slot map based on images captured by a robotic system autonomously navigating the store during an initial scan cycle.

A "scene" is referred to herein as a grouping of a set of slots on inventory structures within the store based on a set of common product labels (e.g., a product category, a product attribute such as gluten-free and/or vegan, and/or a promotional status) associated with the product units arranged in the slots and/or a common fixture type between the slots. The computer system can segment all of the slots within the store into different scenes and, for each slot, annotate the slot map with a slot location, product labels for the product units arranged within the slot, and scene labels associated with the slot. Furthermore, a slot can belong to more than one scene (e.g., a slot can be part of "face wash" scene, a subcategory of the "makeup/beauty" scene, and the "2-for-1 promotion" scene).

The method S100 is described herein as executed by a computer system (e.g., a remote server, a computer network) remote from the robotic system. However, Blocks of the method S100 can be executed locally by one or more robotic systems deployed in a retail space (or store, warehouse, etc.), by a local computer system (e.g., a local server), or by any other computer system.

Furthermore, Blocks of the method S100 are described below as executed by the computer system to identify products, slot tags, and promotional tags on open shelves in shelving structures within a grocery store. However, the computer system can implement similar methods and techniques to identify products, slot tags, and promotional tags on cubbies, in a refrigeration unit, on a wall rack, on a freestanding floor rack, on a table, on a hot-food display, or on or in any other product organizer, display, or other inventory structure in a retail space.

4. Mobile Robotic System

Block S102 of the method S100 recites dispatching a robotic system to autonomously navigate throughout a store and to record images of inventory structures within the store during a scan cycle. Generally, in Block S102, the computer system can dispatch the robotic system to autonomously navigate along a dynamic path and to record (e.g., photographic images and/or depth images) inventory structures throughout the store.

During this scan cycle, the robotic system can: record photographic (e.g., color, black-and-white) images of each inventory structure; record depth images of all or select inventory structures; and upload these photographic and depth images to the computer system, such as in real-time or upon conclusion of the scan cycle. The computer system can then: detect types and quantities of packaged goods stocked in slots on these inventory structures in the store based on data extracted from these photographic and depth images; and aggregate these data into a slot map of the store.

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc. For example, the computer system can dynamically generate its path throughout the store during a scan cycle to maximize a value of inventory structures or particular products imaged by the robotic system per unit time responsive to dynamic obstacles within the store (e.g., patrons, spills), such as described in U.S. patent application Ser. No. 15/347,689, which is incorporated herein in its entirety by reference.

In this implementation, the robotic system can then continuously capture photographic images and/or depth images of inventory structures in the store (e.g., at a rate of 10 Hz, 24 Hz). However, in this implementation, the robotic system can capture images of inventory structures within the store at any other frequency during this scan cycle.

5. Image Access

Block S110 of the method S100 recites accessing an image of an inventory structure. Generally, the robotic system can return photographic and/or depth images recorded during a scan cycle to a remote database, such as in real-time during the scan cycle, upon completion of the scan cycle, or during scheduled upload periods. The computer system can then access these photographic and/or depth images from this database in Block Silo, as shown in FIG. 1, before processing these images according to Blocks of the method S100 described below.

In one implementation, the computer system processes individual photographic images according to the method S100 in order to identify product units depicted in these individual images. Alternatively, the computer system can: stitch multiple photographic images into one composite image representing a greater length of one inventory structure (or greater length of multiple adjacent inventory structures); and then process these "composite" images according to methods and techniques described below.

For example, the computer system can deploy the robotic system to execute a scan cycle in the store. During this scan cycle, the robotic system can: autonomously navigate along a set of inventory structures in the store; capture a sequence of photographic images of the set of inventory structures; and return these photographic images to the computer system, such as in real-time or upon conclusion of the scan cycle.

In another implementation, the computer system can execute Block S110 to access a composite image assembled from images captured by the mobile robotic system at a single location. For example, the computer system can: dispatch the mobile robotic system to a first position in the store adjacent a shelving segment; access a set of images captured via a set of cameras mounted to the mobile robotic system, at the first position; stitch the set of images captured by the mobile robotic system at the first position into a composite image depicting the shelving segment.

Therefore, the computer system can: access a first series of photographic images—in the sequence of photographic images—of an inventory structure captured by the mobile robotic system during the scan cycle; compile this first series of photographic images into a first image of the inventory structure; process this first image as described below; and repeat this process for each other series of photographic images depicting each other inventory structure in the store.

6. Shelving Segment and Segment Identifier

Generally, the computer system can segment an image depicting an inventory structure into a region depicting a particular shelving segment in the store. The computer system can execute Blocks of the method 100 described below to: detect the boundaries of the shelving segment; detect shelves or other structures to support units of product types; and detect a segment tag arranged on the shelving segment and identifying the particular shelving segment. The segment tag can include a unique segment identifier associated with the particular shelving segment. The segment identifier can be associated to a list of product types assigned to the slots or shelves of the shelving segment, a location of the shelving segment in the store, or other information specific to the shelving segment.

6.1 Detecting Shelving Segment Boundary

Generally, the computer system can execute Blocks of the method S100 to detect multiple shelving segments depicted in an image captured by the mobile robotic system. The computer system can detect the boundary between adjacent shelving segments and differentiate each shelving segment based on the boundaries of the shelving segments and the segment identifiers read from the segment tag of each shelving segment. The computer system can detect the lateral extent of the shelving segment based on the left limit and right limit of a shelf face of a shelf depicted in the image, the left limit and right limit defined as the left edge of the shelf face and the right edge of the shelf face, respectively. Additionally, the computer system can detect a vertical offset between shelf faces of shelves in adjacent shelving segments as an additional reference of the limit of the shelving segment.

For example, the computer system can execute Blocks of the method S100 to: detect a second shelf face of a second shelf in a second shelving segment right of a first shelf face of a first shelf in a first shelving segment in the first image; detect a right vertical edge of the first shelf face; detect a left vertical edge of the second shelf face; detect a lateral offset between the right vertical edge of first shelf face and the left vertical edge of the second shelf face; detect a vertical offset between the first shelf face and the second shelf face; and detect the second shelving segment adjacent the first segment based on the lateral offset and the vertical offset.

Therefore the computer system can delineate the boundary between adjacent shelving segments detected in an image based on features detected in the image. However, other features of the shelving segment can be detected by the computer system to delineate the boundaries of the shelving segment such as: a vertical segment end panel, detection of an inventory fixture type different from the inventory fixture type detected in a present inventory structure, or absence of an adjacent shelving segment or inventory structure.

6.2 Product Type Assigned to Shelving Segment

In one implementation, the computer system can access a list of product types assigned to a particular shelving segment in Block S140 and detect a product type present in the particular shelving segment based on detecting product features analogous to features in a product template. The computer system can access a unique set of product templates corresponding to the product types in the list of product types assigned to the particular shelving segment based on the segment identifier in Block S140.

For example, the computer system can execute Blocks of the method S100 to: segment the image into a first subregion depicting a first shelving segment; scan the subregion for a segment identifier; retrieve a set of product templates (e.g., a set of images depicting unit of product types) representing a set of product types assigned to the shelving segment based on the segment identifier; identify product units occupying the shelving segment based on features extracted from the subregion of the image depicting the shelving segment; and update a list of product types assigned to the shelving segment based on the detected product features.

The computer system can then segment the image into a second subregion depicting a second shelving segment and execute Blocks of the method S100 to detect a second set of product features, in the first region of the first image, analogous to a second product template, in the first set of product templates and corresponding to a second product type in the first set of product types and, in response: confirm presence of a second unit of the second product type on the first shelf in the first shelving segment; and append the second product type to the list of product types presently stocked in the first shelving segment.

Therefore, the computer system can access a particular product type in the set of product types assigned to the particular shelving segment, and the product template corresponding to the particular product type, based on the segment identifier of the particular shelving segment. Thereby the computer system reduces the number of product templates necessary to compare to product features detected in the image, and thereby reduces processing load.

In another implementation, the computer system can generate the list of the product types assigned to the shelving segment automatically based on a set of product features detected in the shelving segment during an initial scan of the store. The initial scan of the store can occur during a time at which most of the slots in the shelving segments of the store are stocked with at least one unit of a product type, such as: during onboarding of a new store; or after overnight restocking is complete, but before the store opens to customers.

For example, the computer system can execute Blocks of the method S100 to: access a second image based on data captured by the mobile robotic system during an initial scan cycle preceding the first scan cycle in the store; detect the first shelving segment in a second region of the second image; detect, in the second region of the second image, the first segment tag, a first slot tag proximal the first shelf face, a second shelf face of a second shelf below the first shelf face, and a second slot tag proximal the second shelf face; read, from the first slot tag, a first product identifier corresponding to the first product type assigned to the first slot; read, from the second slot tag, a second product identifier corresponding to a second product type assigned to the second slot; define the first set of product types assigned to the first shelving segment, the set of product types comprising the first product type and the second product type; and associate the first set of product types with the first segment identifier depicted on the first segment tag.

Additionally, the computer system can segment product types stocked in different shelving segments within the store based on the segment identifier. The computer system can: access a first list of products assigned to the first shelving segment based on the first segment identifier; and access a second list of products assigned to the second shelving segment based on the second segment identifier to differentiate shelving segments and product types depicted in a single image.

For example, the computer system can execute Blocks of the method S100 to: detect a first shelving segment in the image in Blocks S120-S124; read a first segment identifier from the first segment tag depicted in the image in Block S130; detect a second shelving segment in the image in Blocks S120-S124; read a second segment identifier from the second segment tag depicted in the image in Block S130; confirm presence of a unit of a second product type on in the second shelving segment in Block S160; and append the second product type to a list of product types presently stocked in the second shelving segment in Block S170.

In another implementation, the computer system can segment product types stocked within the store based on a particular shelf in the shelving segment to which the product type is assigned. For example, the computer system can execute Blocks of the method S100 to detect, in the first image a first slot tag arranged on the first shelf face, and a second slot tag arranged on the first shelf face; assign a first shelf identifier to the first shelf; read a first product identifier, from the first slot tag, corresponding to the first product type assigned to a first slot on the first shelf; read a second product identifier, from the second slot tag, corresponding to a second product type assigned to a second slot on the first shelf; and define a first set of product types assigned to the first shelf of the first shelving segment, the set of product types comprising the first product type and the second product type.

Therefore, the computer system can organize and track product types stocked within the store by segmenting the set of product types into subsets of product types assigned to particular shelving segments based on the segment identifier. Further, the computer system can further segment the shelving segment into individual shelves, and generate a list of product types assigned to an individual shelf.

6.3 Location of a Shelving Segment in the Store

Generally, the computer system can execute Blocks of the method S100 to identify a location of a particular shelving segment in the store and associate the location of the shelving segment to the segment identifier.

For example, the computer system can execute Blocks of the method S100 to: in response to detecting the first segment tag arranged on the first shelving segment, access a current position of the mobile robotic system; define the location of the first shelving segment based on the current position of the mobile robotic system; and associate the location of the first shelving segment to the first segment identifier.

In another variation in which a segment identifier is not present on the shelving segment or the segment identifier is not detectable in the image, the computer system can assign a segment identifier to a particular shelving segment in the store based on the location at which the mobile robotic system captures a particular image depicting the particular shelving segment.

For example, the computer system can execute Blocks of the method S100 to: access the first image based on data captured by the mobile robotic system autonomously traversing the store during a first scan cycle comprises accessing the first image based on data captured, at a first time, by the mobile robotic system; access a position of the mobile robotic system at the first time; and assign the first virtual segment identifier to the first shelving segment based on the position of the mobile robotic system.

Therefore the computer system can automatically assign a location of the shelving segment to the segment identifier based on the position of the mobile robotic system at which an image depicting the shelving segment is captured. Further, the computer system can assign a virtual segment identifier to and location to a particular shelving segment without a segment tag based on the position of the mobile robotic system.

6.4 Locating a Product Type in the Store

Generally, the computer system can retrieve a location of a particular product type in the store by: identifying a list of product types assigned to a particular shelving segment including the particular product type, the list of product types associated to a segment identifier of the particular shelving segment; and retrieving the location associated with the segment identifier.

In one example, the computer system can receive a request for the location of a particular product type in the store. In response, the computer system can access the list of product types assigned to the first shelving segment. In response to confirming the particular product type assigned to the first shelving segment, the computer system returns the first segment identifier and the location of the first shelving segment in the store to a user interface. A store associate or customer can receive the location of the particular product type via the user interface and travel to the location of the first shelving segment in the store to retrieve a unit the particular product type from the first shelving segment.

In another implementation, the computer system can return a particular shelf of a particular shelving segment in the store to return a location of the particular product type in the store with greater accuracy. For example, the computer system can execute Blocks of the method S100 to: access a location of a shelving segment in the store based on the segment identifier; detect a first slot tag arranged on the first shelf face of the first shelf in the first image; detect a second shelf face of a second shelf in the first shelving segment in the first image; and detect a second slot tag arranged on the second shelf face in the first image; read a first product identifier from the first slot tag; assign a first shelf identifier to the first shelf; associate the first product identifier with the first shelf identifier; associate the first shelf identifier with the first segment identifier; read a second product identifier from the second slot tag; assign a second shelf identifier to the second shelf; associate the second product identifier with the second shelf identifier; and associate the second shelf identifier with the first segment identifier. The computer system can then, in response to receiving a query for the first product type, return: the first shelf identifier associated with the first product identifier; the first segment identifier associated with the first shelf identifier; and the first location of the first shelving segment.

In one variation, the first shelf identifier can indicate a first shelf number, the first shelf number indicating the position of the first shelf in an order of shelves in the shelving segment (e.g., the shelves can be ordered one through six, with shelf "one" as the top shelf and shelf "six" as the bottom shelf). The first shelf number can be represented as "three" indicating the third shelf from the top. The computer system can return the location of the shelving segment and the shelf number.

Therefore, the computer system can execute Blocks of the method S100 to access the location of a shelving segment in the store based on the segment identifier. Thereby, the computer system can assist store associates and customer in finding and retrieving a unit of a product type in the store by associating a shelving segment to a location in the store and, in at least one example, to a particular shelf in the shelving segment.

7. Slot Delineation Based on Slot Tags

Block S140 of the method S100 recites: detecting a slot tag on a first shelf face, in a set of shelf faces, on an inventory structure depicted in an image; and delineating a first slot above the first shelf face based on a position of the slot tag in the image. Generally, in Block S140, the computer system can extract features from the image; detect slot tags in the image based on these features; and delineate slots corresponding to the slot tags on the inventory structure.

In one implementation, the computer system can detect the first slot in the inventory structure by locating the first slot in the inventory structure based on a position of the first slot tag detected in the image. For example, the computer system can: scan laterally across a first shelf face region—extracted from the image—for a slot tag. Upon detecting a slot tag in this first shelf face region, the computer system can delineate a slot boundary for the slot corresponding to the slot tag—for example, extending vertically between the first shelf face and a second shelf face above the first shelf face and extending laterally between a first distance (e.g., 20 centimeters) to the left of a left edge of the slot tag and a second distance (e.g., 300 centimeters) to the right of a right edge of the slot tag.

In another implementation, the computer system can execute Blocks of the method S100 to: detect a first slot tag arranged on the first shelf face depicted in the first image; read a first product identifier from the first slot tag; retrieve, based on the first product identifier, the first product type assigned to a first slot, and a first slot boundary of the first slot. The computer system can then define a first slot region of the first image based on the first slot boundary; and detect the first set of product features in the first slot region of the first image analogous to the first product template corresponding to the first product type.

Additionally or alternatively, the computer system can execute Blocks of the method S100 to: read a first product price from the first slot tag; access a current product price from a product database based on the product identifier; and in response to calculating a price difference between the first product price and the current product price greater than a threshold price difference, prompt a store associate to replace the first slot tag with a corrected slot tag.

Thus, the computer system can: detect a first slot tag on the inventory structure in the image; delineate a first slot based on a position of the slot tag in the image; extract a set of features from the first slot tag detected in the image (such as including a barcode); identify a first product identifier (e.g., a SKU value, a product description, and current product pricing) of a first product type advertised by the first slot tag based on the set of features; identify the first product type based on the product identifier (e.g., by querying a product database); and link a slot address for the first slot directly to the first product identifier and/or first product type.

8. Slot Delineation Based on Shelving Features

Additionally or alternatively, the computer system can detect the first slot in the inventory structure by extracting features from the image and detecting discrete shelves in the image based on these features.

In one implementation, the computer system: detects a set of features in the image; extracts—from this set of features—a first linear feature extending laterally across (substantially a full width of) the image; extracts—from this set of features—a second linear feature extending laterally across (substantially the full width of) the image and offset below the first linear feature by a distance approximating a common shelf thickness or a known shelf thickness of inventory structures throughout the store; and correlates the first linear feature and the second linear feature with a first shelf in the inventory structure. In this implementation, the computer system can similarly: extract—from this set of features—a third linear feature extending laterally across the image and offset above the first linear feature; extract—from this set of features—a fourth linear feature extending laterally across the image and offset below the third linear feature by a distance approximating the common or known shelf thickness; and correlate the third linear feature and the fourth linear feature with a second shelf in the inventory structure above the first shelf in the inventory structure.

In the foregoing example, the computer system can then define a first region of the image extending from proximal the first linear feature to proximal the fourth linear feature above and extending across the full width of the image cropped to the width of the inventory structure. The computer system can thus extract a first region of the first image—cropped or otherwise bounded around the inventory structure—corresponding to an accessible volume above the first shelf in the inventory structure. The computer system can repeat this process for each other shelf in the inventory to generate or define a set of image regions, each representing an area or volume above one shelf in the inventory structure.

In another implementation, the computer system can detect the first slot in the inventory structure by extracting features from the image and detecting a change in fixture types in the image based on these features. For example, an inventory structure can include a variety of fixture types, such as shelving structures, refrigeration units, hanging racks, cubbies, etc. for displaying product units on the inventory structure. In particular, the computer system can: detect a set of features in the image; extract—from this set of features—a first linear feature extending laterally across (substantially a full width of) the image; extract—from this set of features—a second linear feature extending laterally across (substantially the full width of) the image; correlate the first linear feature with a first fixture type; correlate the second linear feature with a second fixture type; define a first region of the image having the first fixture type; and define a second region of the image having the second fixture type. The computer system can then repeat this process for each other shelf in the inventory to generate or define a set of image regions, each representing an area or volume of one shelf in the inventory structure.

However, the computer system can implement any other method or technique to segment an image of an inventory structure around a shelf represented in the image.

The computer system can then implement the foregoing methods and techniques to delineate slots within a shelf based on positions of slot tags in the set of regions in the image.

9. Segment Identification Based on Slot Tags

In one implementation, the computer system can assign a virtual segment identifier based on a unique configuration of particular slot tags arranged on the shelving segment. For example, the computer system can execute Blocks of the method S100 to: detect, in the first region of the first image: a first slot tag located at a first position; and a second slot tag located at a second position, different from the first position. The computer system can then read a first product identifier from the first slot tag; and read a second product identifier from the second slot tag, different from the first product identifier. The computer system can then assign the first virtual segment identifier to the first shelving segment based on: the first position of the first slot tag; the second position of the second slot tag; the first product identifier; and the second product identifier.

In this example the computer system can detect a unique pattern defining a set of product identifiers and the relative position of the product identifiers to one another depicted in the image. The computer system applies the virtual product identifier to the shelving segment based on the unique pattern detected in the image.

Therefore, the computer system can assign a segment identifier to a shelving segment based on detection of a unique arrangement of slot tags arranged in the particular shelving segment depicted in the image.

10. Differentiating Segment Tags and Slot Tags

In one implementation, the computer system can scan an image depicting a shelving segment for segment tags based on a first set of attributes unique to segment tags and scan the image for slot tags based on a second set of attributes unique to slot tags. Thereby the computer system can detect a segment tag and a set of slot tags arranged on a shelving segment depicted in a single image. Segment tags and slot tags can be differentiated based on a variety of attributes.

For example, the computer system can execute Blocks of the method S100 to, at a first time: scan the first image for segment tags based on a first segment tag boundary defining a first maximum tag dimension; and detect the first segment tag based on identifying the first segment tag exhibiting the first segment tag boundary in the first image. The computer system can, at a second time: scan the first image for slot tags based on a first slot tag boundary defining a second maximum tag dimension, the second maximum tag dimension greater than the first maximum tag dimension; and detect the first slot tag based on identifying the first slot tag exhibiting the first slot tag boundary in the first image. The computer system can: access a first list of product types assigned to the first shelving segment based on the first segment identifier; read a first product identifier from the first product tag; query the first list of product types assigned to the first shelving segment for the first product identifier. In response to absence of the first product identifier in the first list of product types assigned to the first shelving segment, the computer system can prompt a user to audit the first list of product types assigned to the first shelving segment.

In another example, the computer system can differentiate segment tags and slot tags based on color. The computer system can execute Blocks of the method S100 to, at a first time: scan the first image for segment tags based on a first tag color; and detect the first segment tag based on identifying the first segment tag exhibiting the first tag color in the first image. The computer system can, at a second time: scan the first image for slot tags based on a second tag color, different from the first tag color; and detect the first slot tag based on identifying the first slot tag exhibiting the second tag color in the first image. The computer system can: access a first list of product types assigned to the first shelving segment based on the first segment identifier; read a first product identifier from the first product tag; query the first list of product types assigned to the first shelving segment for the first product identifier. In response to absence of the first product identifier in the first list of product types assigned to the first shelving segment, the computer system can append the first product type to the first list of product types assigned to the first shelving segment.

In another implementation, the computer system can apply the segment identifier to reduce processing load during image analysis. The computer system can: access the set of product types assigned to the shelving segment based on the segment identifier; access the set of product templates corresponding to the set of product types; and attempt to match a set of product features detected in the image to a product template in a first set of product templates. In response to detecting absence of a match between the set of product features detected in the image and a first product template, the computer system repeats the foregoing steps with a second product template in the first set of product templates. In response to detecting absence of a match between the set of product features and each product template in the first set of product templates, the computer system can access a second set of product templates corresponding to a second set of product types assigned to an adjacent segment. The computer system can then attempt to match the set of product features detected in the image and the second set of product templates.

For example, the computer system can execute Blocks of the method S100 to: access a second product template, in the first set of product templates, corresponding to a second product type in the first set of product types assigned to the first shelving segment, in response to detecting absence of the first set of product features corresponding to the first unit of the first product type in the first slot region. In response to detecting a second set of product features, in the first slot region of the first shelving segment depicted in the first image, analogous to the second product template corresponding to the second product type, the computer system can: confirm presence of a second unit of the second product type in the first slot in the first shelving segment; and prompt a store associate to audit the first slot.

In another example, the computer system can execute Blocks of the method S100 to: access a third product template, in a second set of product templates, corresponding to a third product type in a second set of product types assigned to a second shelving segment in response to detecting absence of the second set of product features, in the first slot region in the first image, analogous to the second product template corresponding to the second product type. In response to detecting a third set of product features, in the first slot region of the first shelving segment depicted in the first image, analogous to the third product template corresponding to the third product type, the computer system can: confirm presence of a third unit of the third product type in the first slot in the first shelving segment; and prompt a store associate to remove the third unit of the third product type from the first slot.

Therefore the computer system can detect both segment tags and slot tags depicted in an image and extract information unique to the shelving segment based on the segment identifier and extract information unique to the slot based on the product identifier. Additionally, the computer system can reduce the computational load of identifying a product type depicted in an image by reducing the initial set of product templates to which the computer system compares detected features to product templates corresponding to product types assigned to the particular shelving segment; and in response to failure to match the detected features to a product template, expanding the set of product templates to include additional product types not assigned to the shelving segment.

11. Slot Map

Generally, in Block S130, the computer system can initialize a slot map of a set of inventory structures within the store; access an image of an inventory structure, in the set of inventory structures; delineate slots on the inventory structure based on positions of slot tags on the inventory structure; and populate the slot map with slot locations and product information extracted from the slot tags. Based on the slot map, the computer system can then segment areas of the store into scenes based on the product information for each slot.

More specifically, the computer system can: initialize a slot map of a set of inventory structures within the store; access an image of an inventory structure, in the set of inventory structures, within the store; detect a set of shelving segments on the inventory structure depicted in the image; project a set of vertical lines corresponding to the set of shelving segments of the inventory structure onto the slot map; detect a set of shelf faces on the inventory structure depicted in the image; project a set of horizontal lines corresponding to the set of shelf faces onto the slot map (i.e., forming a 2D vectorized grid on the slot map); and detect a set of slot tags in the image. For each slot tag in the set of slot tags, the computer system can: project a location of the slot tag onto the slot map; detect a slot corresponding to the location of the slot tag; project a set of vertical slot lines corresponding to the slot—such as a first slot line representing a left boundary of the slot and a second slot line representing a right boundary of the slot between the set of vertical lines representing the shelving segments—onto the slot map; identify a product identifier on the slot tag; retrieve a set of product labels (e.g., a product category, a product attribute such as gluten-free or vegan, a promotional status) associated with the product identifier; and annotate the slot map with the product identifier and the set of product labels for the slot corresponding to the slot tag.

The computer system can then repeat the steps above for each inventory structure in the set of inventory structures within the store, thereby populating the slot map with slot locations and product information for all products located throughout the store.

12. Scene Segmentation

Based on the slot map, the computer system can then identify groups of products sharing an identical product label across the inventory structures.

In one implementation, the computer system can: retrieve a first slot location and a corresponding first set of product labels from the slot map; retrieve a second slot location and a corresponding second set of product labels from the slot map; and, in response to the first set of product labels and the second set of product labels including an identical product label, annotate a first scene label including the first slot location and the second slot location on the slot map. In response to the first set of product labels and the second set of product labels not including an identical product label, the computer system can annotate a first scene label including the first slot location and a second scene label including the second slot location on the slot map.

In one example, the set of product labels can include a product category of the product units arranged in the slots. The computer system can then group a set of (e.g., adjacent) slots containing product units in the same product category into the same scene (e.g., all slots containing shampoo bottles are grouped into the "shampoo" scene, all slots containing diapers are grouped into the "diaper" scene). Additionally or alternatively, the computer system can group a set of slots that are located in different areas of the store into the same scene. For example, a store may have a promotional rack arranged near an entrance of the store displaying product units of a product category—separate from an aisle displaying additional product units of the same product category.

In another example, the set of product labels can include a product attribute of the product units arranged in the slots. The computer system can then group a set of slots containing product units with the same product attribute into the same scene (e.g., all gluten-free products are grouped into the "gluten-free" scene, all eco-friendly products are grouped into the "eco-friendly" scene). Accordingly, the computer system can identify all areas of a store in which product units with a particular product attribute are located.

Additionally or alternatively, the computer system can identify groups of products based on a fixture type of the slots containing the product units. In response to detecting a first fixture type in a first region of an inventory structure and a second fixture type in a second region of the inventory structure, the computer system can: segment the first region of the inventory structure into a first scene based on the first fixture type; and segment the second region of the inventory structure into a second scene based on the second fixture type. For example, the computer system can detect that a first region of the inventory structure includes a set of shelves (e.g., with slots containing product units of chips) and that a second region of the inventory structure includes a set of hanging racks (e.g., with slots containing product units of nuts). Accordingly, the computer system can interpret the change in fixture type as an indicator of a change in product category and thus assign a scene label to slot locations sharing an identical fixture type.

Thus, the computer system can generate a comprehensive slot map with slots on inventory structures labeled with a set of scenes that correspond to product labels associated with product units arranged within the slots. Further, a slot can include more than one scene label based on different product labels associated with product units arranged within the slot (e.g., a slot can be part of the "face wash" scene, a subcategory of the "makeup/beauty" scene, and the "2-for-1 promotion" scene).

13. Product Detection

In one implementation, the computer system can implement methods and techniques described in U.S. patent application Ser. Nos. 16/817,972 and 17/104,610, each of which is incorporated herein in its entirety, to detect and identify product units arranged in slots on a shelf—or other types of product organization—of an inventory structure based on features extracted from a region of the image depicting the inventory structure.

In particular, the computer system can: segment the image into subregions depicting slots on shelves; scan each subregion for features representative of product units; identify product units occupying these slots based on features extracted from subregions of the image depicting corresponding slots; and aggregate these derived data into a stock condition of the inventory structure. For example, the computer system can aggregate SKU or UPC identifiers and quantities of products thus detected in the image into a realogram of this inventory structure to reflect, for example, a presence of product units of a product type assigned to a slot, an actual quantity of the product units, and a quantity of misplaced product units occupying the slot (i.e., the "stock condition" of the slot).

The computer system can repeat this process for each other slot detected on this shelf and can update the realogram (e.g., a map, a spreadsheet, or an annotated image) to reflect the current stock condition of the shelf accordingly. The computer system can also repeat this process for each other customer-facing shelf detected on the inventory structure in order to update the realogram (or spreadsheet or annotated image) to reflect the current stock condition of the inventory structure as a whole.

14. Subsequent Scan Cycles

In one implementation, the computer system can dispatch the robotic system to autonomously navigate throughout the store and to record (e.g., photographic images and/or depth images) inventory structures during scan cycles subsequent to the initial scan cycle. Based on the images captured during subsequent scan cycles, the computer system can repeat the process above to re-segment the slot map into scenes.

For example, the store may undergo a reorganization in which the layout of product types on inventory structures throughout the store changes. In the foregoing example, the computer system can: access an image (e.g., a 2D photographic image) of an inventory structure, in a set of inventory structures, within the store; detect a slot tag in the image; identify a product identifier on the slot tag; retrieve a slot location associated with the product identifier from the slot map; delineate a slot corresponding to the slot tag based on a position of the slot tag in the image; and detect a deviation between the slot location and the slot in the image exceeding a distance threshold (e.g., more than 25 centimeters). In response to detecting the deviation, the computer system can: initialize an updated slot map of a set of inventory structures within the store; detect a set of shelving segments on the inventory structure depicted in the image; project a set of vertical lines corresponding to the set of shelving segments of the inventory structure onto the updated slot map; detect a set of shelf faces on the inventory structure depicted in the image; project a set of horizontal lines corresponding to the set of shelf faces onto the updated slot map; and detect a set of slot tags in the image. For each slot tag in the set of slot tags, the computer system can: project a location of the slot tag onto the updated slot map; detect a slot corresponding to the location of the slot tag; project a set of vertical slot lines corresponding to the slot onto the updated slot map; identify a product identifier on the slot tag; retrieve a set of product labels associated with the product identifier; annotate the updated slot map with the product identifier and the set of product labels for the slot corresponding to the slot tag; and replace the slot map with the updated slot map in the product database. Thus, the computer system can accurately maintain and update the slot map without requiring a manual prompt from a store associate if the store undergoes a reorganization.

15. Product Search Portal

Block S180 of the method S100 recites retrieving a set of images depicting a scene within the store. More specifically, the computer system can: generate a user interface on a computing device; receive a set of keywords and/or search terms via the user interface; apply a set of scene filters to the slot map based on the set of keywords and/or search terms; and retrieve a set of images that match the scene filters. For each image in the set of images, the computer system can: define a boundary in the image for a cropped area; and populate the product search portal with the cropped area of the image that depicts the set of scenes that match the scene filters and/or a set of slot locations within the store corresponding to the set of scenes. Thus, the computer system can quickly and efficiently display products to a user and enable the user to check a brand image, an inventory state, etc. of the products.

In one example, a store associate may check products of a "canned good" scene. In the foregoing example, the computer system can: receive a search term "canned good" via the user interface; apply a set of scene filters including "canned good" to the slot map; and retrieve a set of images depicting scenes including products with the product labels "canned good," "cans," and "canned products." The set of images can include a first inventory structure arranged in a middle aisle of the store, a second inventory structure including product units with a current promotion at a front of the store, and a third inventory structure near the frozen foods section. For each image in the set of images, the computer system can: define a boundary in the image around the scene including products with the product labels "canned good," "cans," and "canned products"; and populate the product search portal with a cropped area of the image depicting the scene within the boundary. The store associate may then quickly check an inventory state of each canned good scene at different locations within the store.

In another example, a company associate of a brand "Eco-Clean Products" can use the product search portal to check a state of their products located throughout a store. In the foregoing example, the computer system can: receive a search term "Eco-Clean Products" via the user interface; apply a set of scene filters including "Eco-Clean Products" to the slot map; and retrieve a set of images depicting scenes including products with the product labels "Eco-Clean Products." The set of images can include a first inventory structure arranged in a cleaning product aisle of the store and a second inventory structure arranged in a paper goods aisle of the store. For each image in the set of images, the computer system can: define a boundary in the image around the scene including products with the product labels "Eco-Clean Products"; and populate the product search portal with a cropped area of the image depicting the scene within the boundary. The company associate can then, for each scene containing their Eco-Clean Products within the store, check: an inventory state; an accuracy of product slot tags; a compliance with a promotion schedule; and a competitive placement.

Additionally or alternatively, the computer system can repeat the steps above to detect an inventory state of product units in a scene. More specifically, the computer system can: retrieve a set of images that match the scene filters that were captured within a recent timeframe (e.g., within the past 2 hours to indicate the most current inventory state); and, for each image in the set of images, define a boundary around a first product unit detected in a cropped area of the image. Alternatively, if no product units are present in the image, the computer system can generate a prompt for restocking product units in the scene. Additionally or alternatively, if no images match the scene filters, the computer system can generate a prompt that the store does not carry that product. Thus, the computer system can direct a user to quickly identify any and all locations of a product if stocked within the store.

In another implementation, the computer system can: generate a user interface on a computing device; receive a set of keywords by a user via the user interface (e.g., company name, brand name); apply a set of scene filters, based on the set of keywords, to the slot map; retrieve a set of images that match the scene filters; generate a brand report based on the set of images (e.g., changes to the scenes depicted in the set of images over time); and populate the user interface with the brand report. Additionally or alternatively, the computer system can transmit the brand report via email or to a printer for printing. For example, a brand report can include (for a specific time interval, e.g., a day/week/month): a performance of a product category, such as sell rates and restocking rates; promotional activity, such as compliance with promotions and promotion schedule; market share of a brand's products relative to other brands in that product category (e.g., 80% of all products in that product category of the brand's); and/or a competitive placement of a brand's products within that product category (e.g., shelves at eye-level vs bottom or top shelf).

Thus, by segmenting the store into scenes, the computer system can more efficiently generate reports for brands and/or companies to monitor and evaluate a performance of the brand's products throughout the store.

16. Deviation

Based on images captured by the robotic system during subsequent scan cycles, the computer system can detect a deviation between a current product layout of the store and the slot map initialized and/or updated during a previous scan cycle. For example, the computer system can detect a shift in location of a product area of a scene (e.g., a total cross-sectional area depicted in an image of slots assigned to a scene has translated to the right, left, up, and/or down) and/or a change in size of the product area (e.g., the total cross-sectional area depicted in the image of slots assigned to the scene has shrunk or expanded).

In one implementation, the computer system can: dispatch a robotic system to capture images of inventory structures throughout the store during a subsequent scan cycle. The computer system can then: access a first image containing a first scene of an inventory structure captured during a first scan cycle; calculate a first product area of the first scene depicted in the first image; access a second image containing the first scene captured during a second scan cycle subsequent the first scan cycle; calculate a second product area of the first scene depicted in the second image; and detect a deviation in the second product area relative to the first product area. In response to detecting the deviation exceeding a threshold, the computer system can generate and transmit a prompt to a computing device of a store associate to investigate the scene.

Based on the detected deviation, the computer system can generate feedback for the store associate team. For example, the computer system can generate and transmit a prompt to a store associate: if the product area has changed by more than a threshold; if product units of a first scene are creeping into a product area of a second scene; and/or if the current product layout deviates from the most current slot map by more than a threshold (e.g., at least 4 scenes in the store have a deviation). Accordingly, the store associate may investigate the set of scenes and/or the computer system can dispatch the robotic system to capture additional images of the set of inventory structures throughout the store and to update the slot map.

In one variation, the computer system can scan the scenes of the slot map to confirm a proper placement of product units within the scene. For example, the computer system can detect: whether a product unit is misplaced within a scene; if product units of a first scene are creeping into a product area of a second scene; and/or if a product area of a scene falls below a minimum product area.

In one implementation, the computer system can: receive a set of keywords and/or search terms (e.g., a product category) via a user interface on a computing device; apply a set of scene filters to select a set of scenes on the slot map based on the set of keywords and/or search terms; identify a subset of slot locations within the set of scenes; and retrieve a set of images depicting the subset of slot locations. For each image in the set of images, the computer system can: define a boundary in the image around the subset of slot locations; and, in response to detecting an occlusion (e.g., a non-linear boundary, a boundary that does not match a product definition boundary of product units arranged within a slot), detect a product misplacement on the inventory structure at a slot location corresponding to the occlusion.

Accordingly, the computer system can detect a geometry of product units arranged within a set of scenes on the slot map and flag scenes for inspection in response to detecting abnormal geometry within a scene.

17. Absent or Illegible Segment Tag

Generally, the computer system can access additional data to extrapolate a segment identifier for a particular shelving segment in response to an obstructed, obscured, illegible, missing, or otherwise non-detectable segment tag in an image depicting the particular shelving segment.

For example, the computer system can execute Blocks of the method S100 to detect the first segment tag depicted in the first region of the first image as obscured. In response to detecting the first segment tag as obscured, the computer system accesses a second image based on data captured by the mobile robotic system and: detects the first shelving segment depicted in a first region of the second image; detects the first segment tag depicted in a first region of the second image; reads the first segment identifier from the first segment tag.

In another example, the computer system can execute Blocks of the method S100 to: detect the first segment tag depicted in the first region of the first image as obscured; detect a second shelving segment, adjacent the first shelving segment, depicted in a second region of the first image; detect a second shelf face of a second shelf in the second shelving segment in the second region of the first image; detect a second segment tag depicted in the second region of the first image; read a second segment identifier from the second segment tag; detect a third shelving segment, adjacent the first shelving segment and opposite the second shelving segment, depicted in a third region of the first image; detect a third shelf face of a third shelf, in the third shelving segment in the third region of the first image; detect a third segment tag depicted in the third region of the first image; read a third segment identifier from the third segment tag; and in response to detecting the first segment tag as obscured, interpolate the first segment identifier based on the second segment identifier and the third segment identifier.

Therefore, the computer system can augment the image with additional data in response to detection of an absent or illegible segment tag by retrieving a previous image depicting a legible segment tag or interpolating an expected segment identifier based on additional data detected in the image.

18. Absent or Illegible Slot Tag

In one implementation, the computer system can identify a product unit arranged in a slot on an inventory structure based on nearby product units if a corresponding slot tag is missing or illegible and extract information from in an image depicting the slot (e.g., the slot tag is torn, bent, misshapen, obscured, and/or poorly lit).

More specifically, the computer system can: access an image of an inventory structure, in the set of inventory structures; detect an absence of a slot tag (or an illegible slot tag) corresponding to a first slot in the inventory structure; define a boundary around a first product unit in the first slot in the image; extract a set of features within the boundary of the first product unit; detect a slot tag corresponding to a second slot adjacent the first slot; identify a product identifier on the slot tag; retrieve a scene label associated with the product identifier from the slot map; filter a population of template images based on the scene label; identify a subset of template images corresponding to the scene label; correlate the extracted set of features to a template image in the subset of template images; and identify the first product unit based on the template image. Accordingly, the computer system can efficiently identify a product unit in a slot with a missing or illegible slot tag by reducing the number of template images to compare with the features of the product unit.

Alternatively, if the computer system does not correlate the extracted set of features to a template image in the subset of template images (e.g., above a specified threshold), the computer system can: identify a scene label at a higher category level (e.g., a "canned tuna" scene can be a subcategory of a "canned good" scene); filter the population of template images based on the new scene label; and repeat the steps described above to identify the first product unit based on a template image. In the event that the computer system cannot identify the first product unit based on a template image (e.g., a foreign object), the computer system can flag the product unit for investigation and/or removal by a store associate.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for segmenting scenes of product units arranged in inventory structures within a store, the method comprising:
by a mobile robotic system:
autonomously navigating along shelving structures within the store; and
scanning shelving structures within the store during a first scan cycle; and
by a computer system:
accessing a first image generated based on data captured by the mobile robotic system autonomously traversing the store during the first scan cycle;
detecting, in the first image:
a first shelving segment;
a first shelf face of a first shelf in the first shelving segment;
a first vertical edge of the first shelf face;

a second vertical edge of the first shelf face; and
a second shelving segment adjacent the first shelving segment;
a second segment tag arranged on the second shelving segment;
a third shelving segment adjacent the first shelving segment and opposite the second shelving segment; and
a third segment tag arranged on the third shelving segment;
reading a second segment identifier from the second segment tag;
reading a third segment identifier from the third segment tag;
in response to detecting the first segment tag as obscured in the first image, interpolating the first segment identifier based on the second segment identifier and the third segment identifier;
based on the first segment identifier, accessing a first set of product templates representing a first set of product types assigned to the first shelving segment;
defining a first region in the first image depicting the first shelving segment based on the first vertical edge of the first shelf face and the second vertical edge of the first shelf face; and
in response to detecting a first set of product features, in the first region of the first image, analogous to a first product template, in the first set of product templates and corresponding to a first unit of a first product type in the first set of product types:
confirming presence of the first unit of the first product type on the first shelf in the first shelving segment; and
recording the first product type as presently stocked in the first shelving segment.

2. The method of claim 1, further comprising, by the computer system:
in response to detecting a second set of product features, in the first region of the first image, analogous to a second product template, in the first set of product templates and corresponding to a second product type in the first set of product types:
confirming presence of a second unit of the second product type on the first shelf in the first shelving segment; and
recording the second product type as presently stocked in the first shelving segment.

3. The method of claim 1, further comprising, by the computer system:
accessing a second image based on data captured by the mobile robotic system during an initial scan cycle preceding the first scan cycle in the store;
detecting the first shelving segment in the second image;
detecting, in the second image:
the first segment tag;
a first slot tag proximal the first shelf face;
a fourth shelf face of a fourth shelf below the first shelf face; and
a second slot tag proximal the fourth shelf face;
reading, from the first slot tag, a first product identifier corresponding to the first product type assigned to the first slot;
reading, from the second slot tag, a second product identifier corresponding to a second product type assigned to the second slot;
defining the first set of product types assigned to the first shelving segment, the set of product types comprising the first product type and the second product type; and
associating the first set of product types with the first segment identifier depicted on the first segment tag.

4. The method of claim 1:
further comprising, by the computer system:
dispatching the mobile robotic system to a first position in the store adjacent the first shelving segment;
accessing a first set of images captured via a set of cameras mounted to the mobile robotic system, at the first position; and
stitching the first set of images captured by the mobile robotic system at the first position into a first composite image depicting the first shelving segment; and
wherein accessing the first image generated based on data captured by the mobile robotic system comprises accessing the first composite image.

5. The method of claim 1, further comprising, by the computer system:
detecting, in the first image:
a third vertical edge of the second shelf face;
a fourth vertical edge of the second shelf face; and
based on the second segment identifier, accessing a second set of product templates representing a second set of product types assigned to the second shelving segment, the second set of product types different from the first set of product types;
defining a second region in the first region depicting the second shelving segment based on the third vertical edge of the second shelf face and the fourth vertical edge of the second shelf face; and
in response to detecting a second set of product features, in the second region of the first image, analogous to a second product template, in the second set of product templates and corresponding to a second product type in the second set of product types:
confirming presence of a second unit of the second product type on the second shelf in the second shelving segment; and
recording the second product as stocked in the second shelving segment.

6. The method of claim 5:
wherein detecting the second shelf face in the first image comprises detecting the second shelf face right of the first shelf face in the first image;
wherein detecting the first vertical edge of the first shelf face comprises detecting a right vertical edge of the first shelf face;
wherein detecting the third vertical edge of the shelf face comprises detecting a left vertical edge of the shelf face;
further comprising, by the computer system, detecting:
a lateral offset between the right vertical edge of first shelf face and the left vertical edge of the second shelf face; and
a vertical offset between the first shelf face and the second shelf face; and
wherein detecting the second shelving segment in the first image comprises detecting the second shelving segment adjacent the first segment based on the lateral offset and the vertical offset.

7. The method of claim 1:
further comprising, by the computer system:
detecting, in the first image, a first slot tag arranged on the first shelf face;

reading a first product identifier from the first slot tag;
retrieving, based on the first product identifier:
the first product type assigned to a first slot; and
a first slot boundary of the first slot; and
defining a first slot region of the first image based on the first slot boundary; and
wherein detecting the first set of product features analogous to the first product template corresponding to the first product type comprises detecting the first set of product features in the first slot region of the first image.

8. The method of claim 7, further comprising, by the computer system:
reading a first product price from the first slot tag;
accessing a current product price from a product database based on the product identifier; and
in response to calculating a price difference between the first product price and the current product price greater than a threshold price difference, prompting a store associate to replace the first slot tag with a corrected slot tag.

9. The method of claim 7:
wherein detecting the first slot tag in the first image comprises:
scanning the first image for slot tags based on a first slot tag boundary defining a first maximum tag dimension; and
detecting the first slot tag based on identifying the first slot tag exhibiting the first slot tag boundary in the first image; and
further comprising, by the computer system:
accessing a first list of product types assigned to the first shelving segment based on the first segment identifier;
querying the first list of product types assigned to the first shelving segment for the first product identifier; and
in response to absence of the first product identifier in the first list of product types assigned to the first shelving segment, prompting a user to audit the first shelving segment.

10. The method of claim 7:
wherein detecting the first slot tag in the first image comprises:
scanning the first image for slot tags based on a tag color; and
detecting the first slot tag based on identifying the first slot tag exhibiting the tag color in the first image; and
further comprising, by the computer system:
accessing a first list of product types assigned to the first shelving segment based on the first segment identifier;
querying the first list of product types assigned to the first shelving segment for the first product identifier; and
in response to absence of the first product identifier in the first list of product types assigned to the first shelving segment, appending the first product type to the first list of product types assigned to the first shelving segment.

11. The method of claim 7, further comprising, by the computer system:
in response to detecting absence of the first set of product features corresponding to the first unit of the first product type in the first slot region, accessing a second product template, in the first set of product templates, corresponding to a second product type in the first set of product types assigned to the first shelving segment; and
in response to detecting a second set of product features, in the first slot region of the first shelving segment depicted in the first image, analogous to the second product template corresponding to the second product type:
confirming presence of a second unit of the second product type in the first slot in the first shelving segment; and
prompting a store associate to audit the first slot.

12. The method of claim 11, further comprising, by the computer system:
in response to detecting absence of the second set of product features, in the first slot region in the first image, analogous to the second product template corresponding to the second product type, accessing a third product template, in a second set of product templates, corresponding to a third product type in a second set of product types assigned to the second shelving segment; and
in response to detecting a third set of product features, in the first slot region of the first shelving segment depicted in the first image, analogous to the third product template corresponding to the third product type:
confirming presence of a third unit of the third product type in the first slot in the first shelving segment; and
prompting a store associate to remove the third unit of the third product type from the first slot.

13. The method of claim 1, further comprising, by the computer system:
detecting, in the first image:
a first slot tag arranged on the first shelf face; and
a second slot tag arranged on the first shelf face;
reading, from the first slot tag, a first product identifier corresponding to the first product type assigned to a first slot on the first shelf;
reading, from the second slot tag, a second product identifier corresponding to a second product type assigned to a second slot on the first shelf; and
defining a first set of product types assigned to the first shelf of the first shelving segment, the set of product types comprising the first product type and the second product type.

14. The method of claim 1, further comprising, by the computer system:
accessing a current position of the mobile robotic system;
recording the location of the first shelving segment based on the current position of the mobile robotic system; and
associating the location of the first shelving segment with the first segment identifier.

15. The method of claim 1, further comprising, by the computer system:
accessing a first location of the first shelving segment in the store based on the first segment identifier;
detecting, in the first image:
a first slot tag arranged on the first shelf face of the first shelf;
a second shelf face of a second shelf in the first shelving segment; and
a second slot tag arranged on the second shelf face;
reading a first product identifier from the first slot tag;
assigning a first shelf identifier to the first shelf;

associating the first product identifier with the first shelf
identifier;
associating the first shelf identifier with the first segment
identifier;
reading a second product identifier from the second slot
tag;
assigning a second shelf identifier to the second shelf;
associating the second product identifier with the second
shelf identifier;
associating the second shelf identifier with the first segment identifier; and
in response to receiving a query for the first product type,
returning:
the first shelf identifier associated with the first product
identifier;
the first segment identifier associated with the first shelf
identifier; and
the first location of the first shelving segment.

16. The method of claim 1, further comprising, by the mobile robotic system deployed in the store:
autonomously navigating along a first shelving structure within the store, the first shelving structure comprising the first shelving segment;
capturing the first image, within a field of view of an optical sensor arranged in the mobile robotic system while occupying a first location proximal the first shelving structure; and
transmitting the first image to a computer system.

17. A method for segmenting scenes of product units arranged in inventory structures within a store comprising:
by a robotic system deployed in the store:
autonomously navigating along a first shelving structure segment within the store; and
capturing a first image, within a field of view of an optical sensor arranged in the robotic system while occupying a first location proximal the first shelving structure, during a first scan cycle;
by a computer system:
accessing the first image generated based on data captured by the mobile robotic system autonomously traversing the store during the first scan cycle;
detecting, in the first image:
a first shelving segment;
a first shelf face of a first shelf in the first shelving segment;
a first vertical edge of the first shelf face;
a second vertical edge of the first shelf face;
a first segment tag, arranged on the first shelving segment comprising, at a first time:
scanning the first image for segment tags based on a first tag color; and
detecting the first segment tag based on identifying the first segment tag exhibiting the first tag color in the first image; and
a first slot tag arranged on the first shelf face comprising, at a second time:
scanning the first image for slot tags based on a second tag color, different from the first tag color; and
detecting the first slot tag based on identifying the first slot tag exhibiting the second tag color in the first image;
reading a first segment identifier from the first slot tag;
retrieving, based on the first product identifier:
the first product type assigned to a first slot; and
a first slot boundary of the first slot; and
based on the first segment identifier, accessing a first set of product templates representing a first set of product types assigned to the first shelving segment;
defining a first region in the first image depicting the first shelving segment based on the first vertical edge of the first shelf face and the second vertical edge of the first shelf face;
in response to detecting a first set of product features, in the first region of the first image, analogous to a first product template, in the first set of product templates and corresponding to a first unit of a first product type in the first set of product types:
confirming presence of the first unit of the first product type on the first shelf in the first shelving segment; and
recording the first product type as presently stocked in the first shelving segment;
accessing a first list of product types assigned to the first shelving segment based on the first segment identifier;
querying the first list of product types assigned to the first shelving segment for the first product identifier; and
in response to absence of the first product identifier in the first list of product types assigned to the first shelving segment, appending the first product type to the first list of product types assigned to the first shelving segment.

\* \* \* \* \*